United States Patent [19]

Boughten et al.

[11] Patent Number: 5,014,407

[45] Date of Patent: May 14, 1991

[54] TUBE EXPANDING DEVICE

[76] Inventors: Larry R. Boughten; Christopher J. Evoniuk; James M. Scott; Karen E. Staff, all of P.O. Box 33427, St. Paul, Minn. 55133-3427

[21] Appl. No.: 415,128

[22] Filed: Sep. 28, 1989

[51] Int. Cl.[5] .............................................. B23P 19/02

[52] U.S. Cl. ....................................... 29/235; 29/758; 29/857; 606/207; 606/209

[58] Field of Search ......................... 29/235, 758, 857; 606/207, 209

[56] References Cited

U.S. PATENT DOCUMENTS

| | | | |
|---|---|---|---|
| 1,362,308 | 12/1920 | Heaton . | |
| 1,683,119 | 9/1928 | Ziegler . | |
| 2,447,474 | 8/1948 | Hammond . | |
| 2,582,640 | 1/1952 | Maddox . | |
| 2,944,335 | 7/1960 | Kabel | 29/235 |
| 3,946,480 | 3/1976 | Dienes | 29/235 |
| 4,261,089 | 4/1981 | Taylor | 29/235 |
| 4,302,176 | 11/1981 | Gordon | 425/392 |
| 4,410,009 | 8/1983 | Blum | 138/109 |
| 4,572,179 | 2/1986 | Teitelbaum et al. | 29/235 X |

FOREIGN PATENT DOCUMENTS

| | | | |
|---|---|---|---|
| 2211778 | 7/1974 | France | 29/758 |
| 2041150 | 9/1980 | United Kingdom | 29/235 |

OTHER PUBLICATIONS

Brochure entitled "Hellerman Electric"—publication date—Jul. 1983, Catalog of Hellerman Electric (no publication date found).

*Primary Examiner*—P. W. Echols
*Assistant Examiner*—Carl J. Arbes

[57] ABSTRACT

A tool for expanding elastic tubes which may then be placed around wires or cables. The tool includes three arms terminating in three parallel, elongated tips. Two of the arms are pivotally attached, while the third is retractably coupled to the first two. An elastic tube is positioned over all three tips when they are in close contact. When the handles of the tool are squeezed, all three tips separate, thereby expanding the tube. The tool may be used to apply insulating covers to cable splices, or for marking terminal connections with color-coded tubes.

9 Claims, 3 Drawing Sheets

TUBE EXPANDING DEVICE

BACKGROUND OF THE INVENTION

1. Field of the Invention

The present invention generally relates to elastomeric tubing, and more particularly to a device and method for securing such tubing around electrical splices and terminals in order to insulate or identify them.

2. Description of the Prior Art

Elastic tubes formed from synthetic or natural materials are commonly used in the electronics industry to facilitate connection of wiring and component parts. The present invention relates to two such applications, namely, insulating electrical splices, and color-coding terminal connectors.

With respect to cable splices, two different kinds of tubing are typically used, viz., heat shrink (thermoplastic) tubing and cold shrink (pre-stretched) tubing. In either case, the tube is attached to the splice by first inserting an end of one of the cables through the tube, performing the splice, and shifting the tube over the splice. With heat shrink tubing, a heat source is then applied, and the tube shrinks around the splice, thereby insulating it. In the case of cold shrink tubing, the tube is pre-stretched over a collapsible core. It is placed over one of the cables in this condition and, after the splice is completed, the tubing is positioned over the splice and the core removed, and the tube shrinks to its relaxed state.

In regard to terminal connectors, it is often useful or necessary to label or otherwise identify terminal connections of interconnected electrical systems. The use of cold shrink tubing in this application is exceedingly difficult since the dimensions involved are particularly small (around 2 millimeter inner tube diameter for most wires) and it is not economically feasible to fabricate collapsible cores which can fit into such a small tube. Accordingly, the technique has heretofore been limited to the use of heat shrink tubing only. This is performed in a manner similar to that described above with respect to cable splices, i.e., insertion of the terminal through the heat shrink tube, and application of a heat source. The color of the tube may then be used to identify the terminal.

The foregoing techniques have several disadvantages. First of all, the use of heat shrink material is more time consuming than the use of cold shrink tubing. Heat shrink tubing also requires a heat source, such as an infrared heater or hot-air gun. Elastomeric tubing, on the other hand, requires provision of the tubing in a pre-stretched state with the collapsible core in place (this process cannot be performed in the field), which also increases expense. Finally, as noted above, cold shrink tubing has proved impossible to use with small terminal connections. It would, therefore, be desirable and advantageous to devise a tool which would facilitate placement, about a terminal connector or cable, of elastomeric tubing which is not pre-stretched and therefore requires no collapsible core.

The closest prior art to such a device is probably a group of plier-like tools used to expand elastic rings. Variations of these tools are described in the following U.S. Pat. Nos.

| U.S. Pat. No. | Inventor |
|---|---|
| 1,362,308 | F. Heaton |
| 1,683,119 | C. Ziegler |
| 2,447,474 | A. Hammond |
| 2,582,640 | C. Maddox |
| 4,261,089 | G. Taylor |

The common design characteristic of these devices is the provision of studs or prongs which are passed through an elastic ring and forced apart. The tools disclosed in these patents, however, are unsatisfactory for the stated purpose of this invention, primarily because they are designed to expand rings rather than elongated tubes. For example, the Heaton patent notes (col. 3, l. 7) that knobs on the end of the expanding lugs prevent the lugs from slipping out of the elastic ring. If used with elastic tubing, this feature would have the undesirable consequence of precluding removal of the lugs from the tube. In other words, these devices may be used to expand tubing, but they cannot be withdrawn from the tubing after a cable or wire has been inserted therein.

Accordingly, the primary object of the present invention is to provide a device for expanding elastomeric tubing.

Another object of the invention is to provide such a device which may be used to apply elastomeric tubing to electrical splices and terminal connectors.

Still another object of the invention is to provide such a device which minimizes friction in applying the tubing to the splice or terminal.

Yet another object of the invention is to provide specialized tips for such a device which may be used to apply adhesive or other sealing compounds around the splice.

SUMMARY OF THE INVENTION

The foregoing objects are achieved in a tube delivery device having at least three parallel, elongated tips which, in a relaxed state, are in close contact. Two of the tips are attached to lever arms and the third is attached to a retracting arm. An elastic tube is placed over the tips and, as the handles of the device are squeezed, all three tips separate, radially expanding the tube. An adjustable stop gauges the expansion of the tips to insure that the tube is not excessively distended.

In the preferred embodiment, the tips are provided with friction reducing means, such as a nonstick coating, air pores or a slot providing an air slip layer, or small roller bearings. This facilitates removal of the tips from the tube after a cable or wire has been inserted therein. The tips are removable so as to provide different sizes for different applications.

BRIEF DESCRIPTION OF THE DRAWINGS

The novel features of the invention are set forth in the appended claims. The invention itself, however, will best be understood by reference to the accompanying drawings, wherein:

FIG. 6A shows porous tips, FIG. 6B shows slotted tips, and FIG. 6C shows tips having roller bearings.

DESCRIPTION OF THE PREFERRED EMBODIMENT

Figure 1:
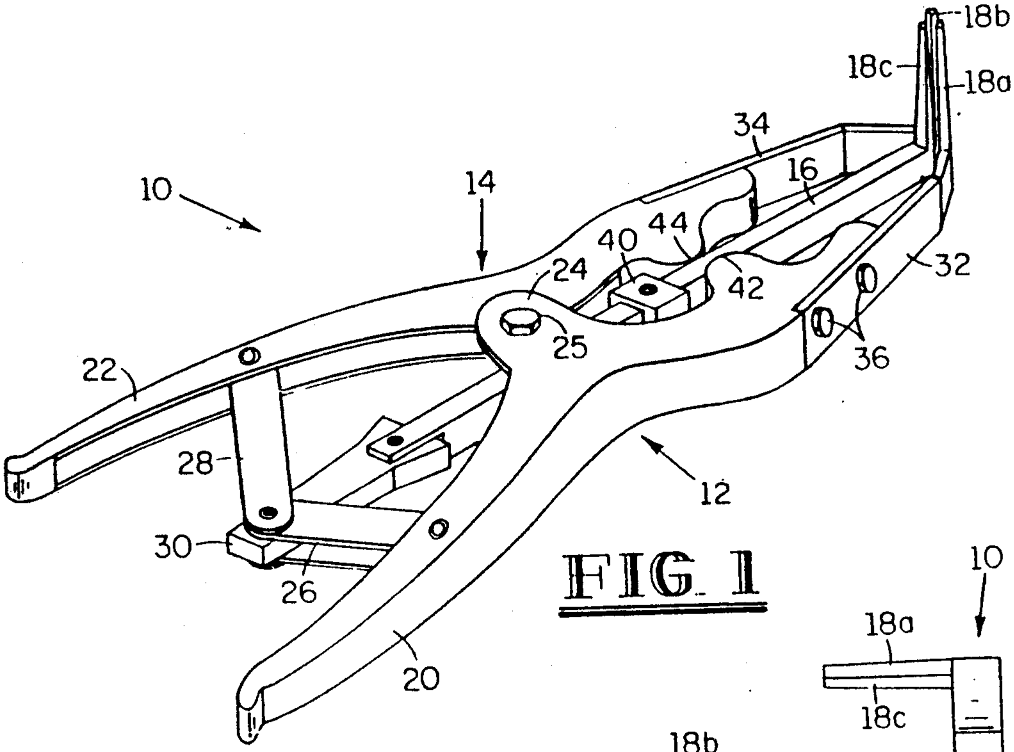
FIG. 1 is a perspective view of the tube delivery device of the present invention.
Figure 2:
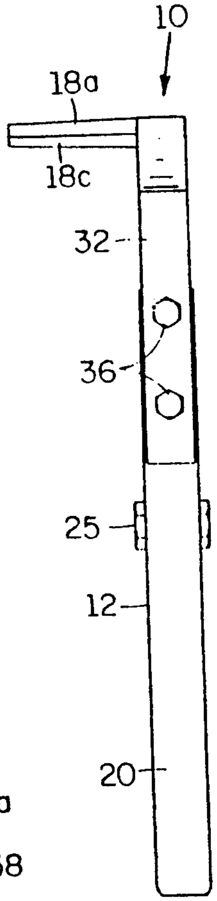
FIG. 2 is a side elevational view thereof.

With reference now to the figures, and in particular with reference to FIGS. 1 and 2, there is depicted the tube delivery device 10 of the present invention. Tube delivery device 10 is generally comprised of lever arms 12 and 14, and retracting arm 16, terminating in tips 18*a*, 18*b* and 18*c*, respectively. Lever arms 12 and 14 each include integral handle portions 20 and 22, respectively, and are pivotally attached at hub 24, preferably by means of a bolt 25. Bolt 25 is provided with a slot (not visible in the drawings) through which retracting arm 16 passes. Lever arms 12 and 14 (as well as all other component parts of tube delivery device 10) may be constructed of any durable material, preferably stainless steel.

Retracting arm 16 is coupled to both lever arms 12 and 14 via linkages 26 and 28. One end of linkage 26 is pivotally attached (riveted) to handle 20, while the other end is pivotally attached (riveted) to a connector block 30. Likewise, one end of linkage 28 is pivotally attached to handle 22 while the other end is pivotally attached to connector block 30. The opposite end of connector block 30 is removably connected to retracting arm 16, which passes through bolt 25. The provision of connector block 30 is optional but is preferred since it simplifies replacement of retracting arm 16. Such replacement may be desirable if the integral tip 18*c* has become damaged, or if different tip sizes are required.

Similarly, tips 18*a* and 18*b* are removably attached to lever arms 12 and 14 by means of projecting fingers 32 and 34 which are formed integrally with tips 18*a* and 18*b*. Fingers 32 and 34 may be attached to lever arms 12 and 14 by any convenient means, such as bolts 36. Arms 12 and 14 may include recessed portions as shown which conform to the shape of fingers 32 and 34. Fingers 32 and 34 bend inwardly toward retracting arm 16 and are of an appropriate length whereby, when handles 20 and 22 are spread apart as far as possible, tips 18*a*, 18*b* and 18*c* all converge in close contact. Tips 18*a* and 18*b* project perpendicularly from fingers 32 and 34, respectively, and tip 18*c* projects perpendicularly from retracting arm 16. Thus all of the tips are essentially parallel.

In order to facilitate use of the device with sections of elastic tubing, tips 18*a*, 18*b* and 18*c* are elongated and tapered. In this regard, the term "elongated" means a tip length which is at least ten times as long as the diameter of the single tip base. Of course, the actual size of the tips will vary according to the size of tubing to be used. For very small tubing, such as that used with wire terminals, each tip will be almost needle-like, e.g., a length of about 2 centimeters and a base diameter of about 0.1 centimeters. For in-line splices of utility cables, the tubing may be as long as 4 centimeters, requiring tips of a similar length and a base diameter of 0.2 centimeters. More than three tips may be provided, but at least three are necessary to adequately expand the elastic tube.

Figure 3A:
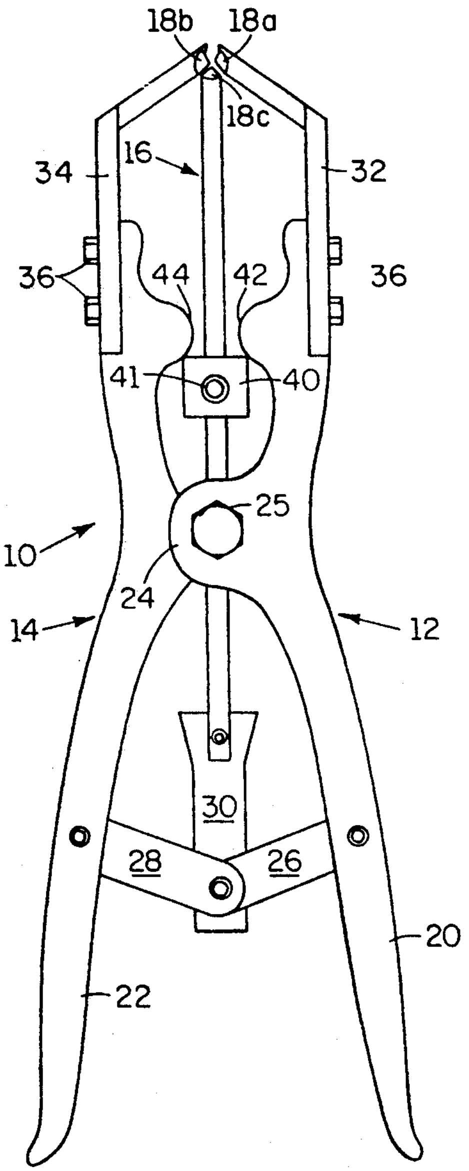
FIGS. 3A and 3B are front plan views of the tube delivery device depicting its contracted and expanded states, respectively.
Figure 3B:
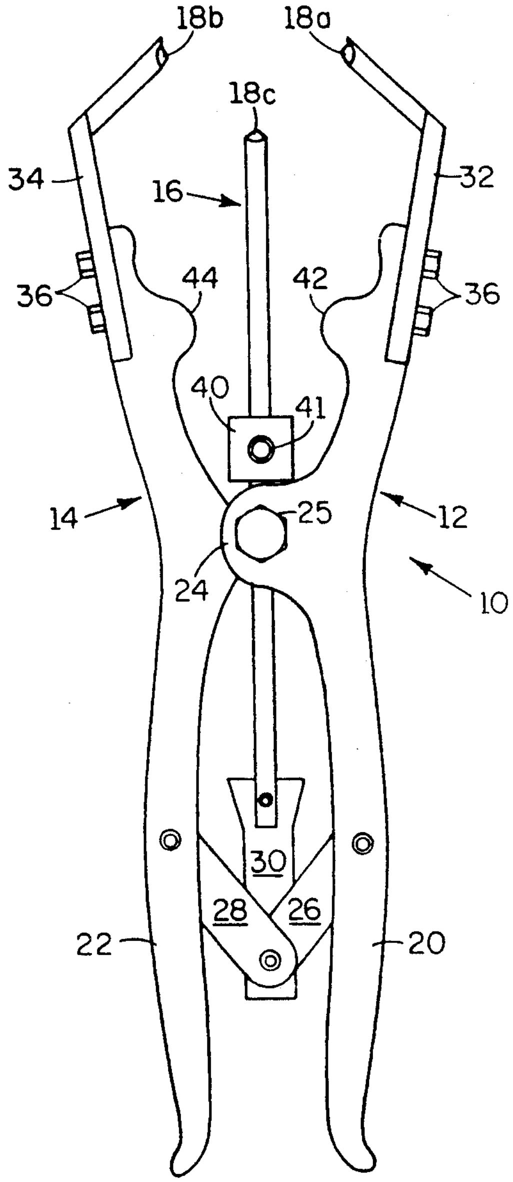

The contracted and expanded states of tube delivery device 10 are illustrated in FIGS. 3A and 3B, to which attention is now directed. In FIG. 3A, handles 20 and 22 are at their maximum separation, resulting in the convergence of tips 18*a*, 18*b* and 18*c*. In the preferred embodiment, this maximum separation is limited by a stop block 40 which is slidably attached to retracting arm 16. Stop block 40 is held in place by an Allen screw 41. Lever arms 12 and 14 are provided with lobes 42 and 44, respectively, along their inner surfaces which make contact with stop block 40 when tube delivery device 10 is in the contracted state. In this manner, excessive wear on tips 18*a*, 18*b* and 18*c* (due to repeated impact each time tube delivery device 10 is contracted) is avoided.

When handles 20 and 22 are squeezed together, tips 18*a*, 18*b* and 18*c* expand as shown in FIG. 3B, forming the vertices of a triangle. The expansion is also limited by stop block 40 which, in the expanded state, forcibly contacts hub 24. It will be appreciated that, due to the coupling of retracting arm 16 to handles 20 and 22, stop block 40 limits not only the movement of tip 18*c* but also the movement of tips 18*a* and 18*b*. This prevents tube 46 from becoming excessively distended. The maximum spacing between tips may accordingly be varied by adjusting the position of stop block 40 along retracting arm 16; however, changing the position of stop block 40 for this purpose would have the undesirable side effect of altering the position of the tips in the contracted state. Therefore, stop blocks of different length may be used to coordinate the contracted and expanded positions of the tips.

Figure 4A:
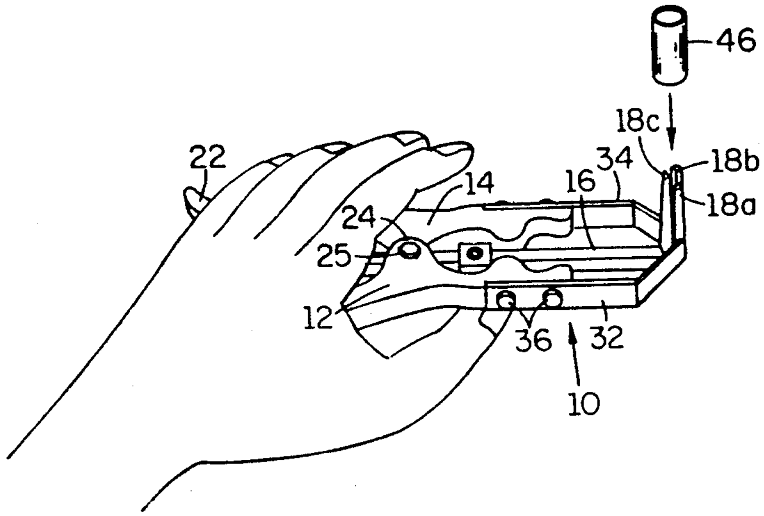
FIGS. 4A and 4B illustrate use of the tube delivery device of the present invention in securing an elastic tube around a terminal connector.
Figure 4B:
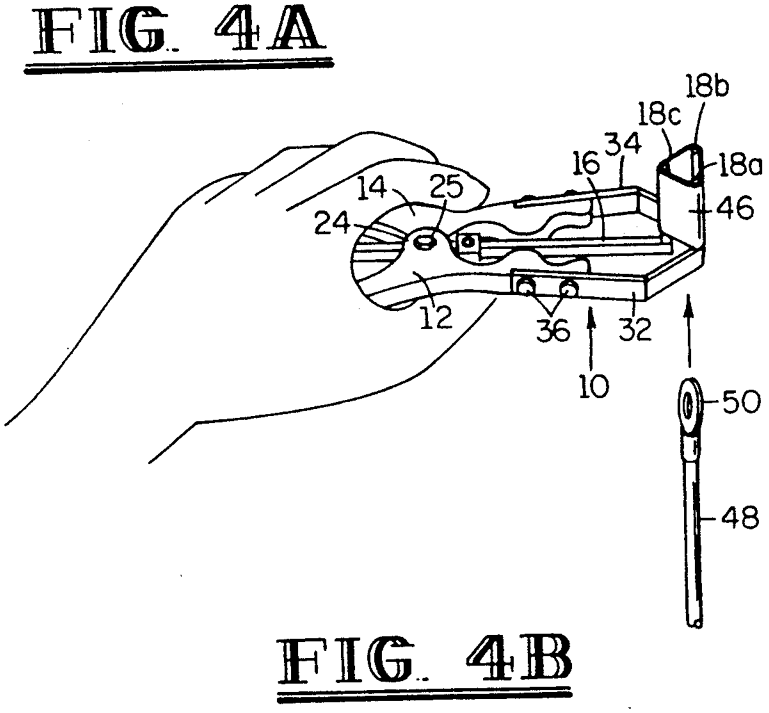
Figure 5:
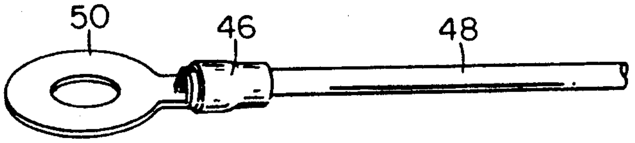
FIG. 5 is a perspective view of a terminal connector having a color-coded tube thereon.

Referring now to FIGS. 4A and 4B, use of tube delivery device 10 is explained. The device is first held in its contracted state, as shown in FIG. 4A, with tips 18*a*, 18*b* and 18*c* all in close proximity. An elastic tube 46 is then guided over the tips. Tube 46 may be constructed of any elastomeric material, such as silicone rubber or ethylene propylene rubber. Once tube 46 is in place, handles 20 and 22 are squeezed, expanding tube 46 into a triangular-like cylinder (prism), as shown in FIG. 4B. The cable or wire may then be inserted through tube 46. In the application shown, a wire 48 having a terminal connector 50 is threaded into tube 46. After so positioning terminal connector 50, handles 20 and 22 are released, and the tips slip away from tube 46 as tube delivery device 1*c* is lowered. The result is shown in FIG. 5. For this particular application, tube 46 is color-coded (or provided with other visual identification means) to identify the nature of the terminal. Multiple tubes of different colors could be so attached to a single terminal for more detailed coding. Placement of tube 46 about terminal connector 50 has the further advantage of reinforcing the attachment of terminal connector 50 to wire 48. A closure may be affixed to a cable splice in a similar manner.

Bias means (not shown), such as a helical spring, may be provided to urge tube delivery device 10 to the contracted state shown in FIG. 3A. This would simplify the initial placement of tube 46 about tips 18*a*, 18*b* and 18*c*. Such biasing, however, is not included in the preferred embodiment, since this would increase frictional resistance between the tips and wire 48 as tube delivery device 10 is removed therefrom.

Figure 6A:
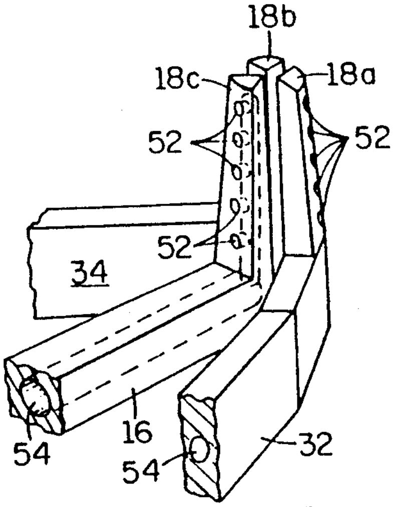
FIGS. 6A through 6C depict alternative designs for the tips of the tube delivery device.
Figure 6B:
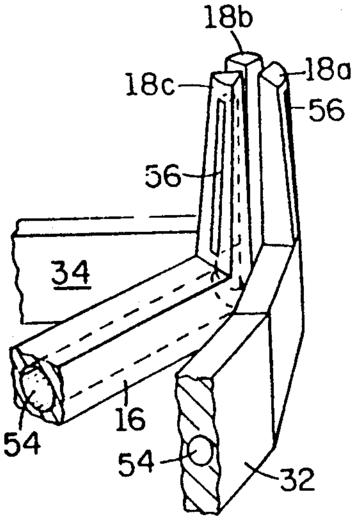
Figure 6C:
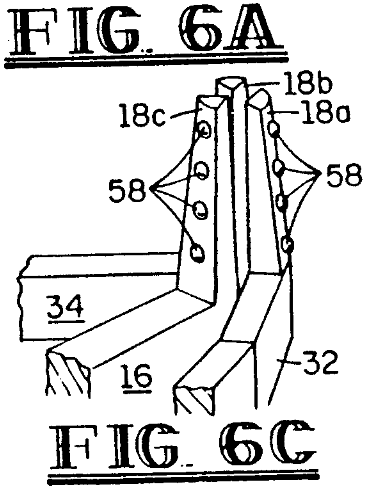

In this regard, tips 18*a*, 18*b* and 18*c* are designed to minimize such frictional resistance. This may be accomplished by providing a friction reducing (lubricant) coating, such as TEFLON (polytetrafluoroethylene). The tips may optionally be specially constructed to assist in their removal. Some alternative designs are shown in FIGS. 6A-6C. In the design of FIG. 6A, the tips have a plurality of orifices 52 which are in fluid communication with voids or channels 54 running through retracting arm 16 and fingers 32 and 34. The design of FIG. 6B is similar, but a slot 56 is provided. In either case, the channels 54 are connected to a pump (not shown) which supplies air under pressure to orifices 52 or slot 56. This creates an air-slip layer between the tips and the inner surface of tube 46. The channel running through the tips should be bored so as to provide the same pressure at each of the orifices The design of FIG. 6C includes a plurality of roller bearings 58 imbedded in the tips, similar to the roller bearings found at the tips of ball-point pens.

The designs of FIGS. 6A and 6B may also advantageously be used to apply fluid materials between the elastic tube and the cable or wire which it surrounds. For example, an adhesive may be injected through orifices 52 or slot 54 in order to further secure the tube in place. Similarly, sealing compounds may be used to prevent exposure of the cable splice to environmental influences.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, the manual device described herein could be automated by providing an actuator mechanism similar to that disclosed in U.S. Pat. No. 4,261,089. The present invention could also be used in other applications, such as loading cold-shrink tubing onto the collapsible cores. It is therefore contemplated that the appended claims will cover such modifications that fall within the true scope of the invention.

We claim:

1. A device for expanding an elastic tube, comprising:
first, second and third arm members each having a distal end;
first, second and third tip members disposed at said distal ends of said first, second and third arm members, respectively:
means for coupling said arm members together, said coupling means including means for moving said arm members between contracted and expanded states, said tip members being in close contact in said contracted state and separated in said expanded state; and means for adjustably limiting the separation between said tip members in said expanded state.

2. The device of claim 1 further comprising means for reducing friction between said tip members and the elastic tube.

3. The device of claim 1 wherein at least two of said tip members are removably attached to said arm members.

4. The device of claim 2 wherein at least two of said tip members are removably attached to said arm members.

5. The device of claim 4 wherein said first and second arm members comprise first and second lever arms, and said third arm member comprises a retracting arm, said first lever arm being pivotally attached to said second lever arm, and said retracting arm being coupled to both said first and second lever arms.

6. A device for expanding an elastic tube, comprising:
first, second and third arm members each having a distal end;
first, second and third tip members disposed at said distal ends of said first, second and third arm members, respectively, a given one of said tip members having bearing means for reducing friction between said given tip member and the elastic tube; and
means for coupling said arm members together, said coupling means including means for moving said arm members between contracted and expanded states, said tip members being in close contact in said contracted state and separated in said expanded state.

7. A device for expanding an elastic tube, comprising:
first, second and third arm members each having a distal end;
first, second and third tip members disposed at said distal ends of said first, second and third arm members, respectively;
means for providing an air-slip layer adjacent a given one of said tip members, thereby reducing friction between said given tip member and the elastic tube; and
means for coupling said arm members together, said coupling means including means for moving said arm members between contracted and expanded states, said tip members being in close contact in said contracted state and separated in said expanded state.

8. The device of claim 7 wherein said means for providing an air-slip layer comprises a slot in fluid communication with a channel in said given tip member, for connection to an external air pump.

9. The device of claim 7 wherein said means for providing an air-slip layer comprises a plurality of orifices in fluid communication with a channel in said given tip member, for connection to an external air pump.

* * * * *